United States Patent [19]
Hallberg et al.
[11] 4,448,406
[45] May 15, 1984

[54] WORKPIECE POSITIONING VISE

[75] Inventors: Frederick C. Hallberg, Wheaton; Clyde J. Morgan, Oxon Hill, both of Md.

[73] Assignee: The United States of America as represented by the Administrator, National Aeronautics and Space Administration, Washington, D.C.

[21] Appl. No.: 364,094

[22] Filed: Mar. 31, 1982

[51] Int. Cl.[3] .............. B23Q 3/18

[52] U.S. Cl. .............. 269/224; 269/242; 269/244; 269/252; 269/285

[58] Field of Search .............. 269/242, 244, 253, 252, 269/250, 240, 224, 285; 125/23, 35; 308/3 A, 4 R, 6 R

[56] References Cited

U.S. PATENT DOCUMENTS

| | | | |
|---|---|---|---|
| 1,411,013 | 3/1922 | Gilmore | 269/285 |
| 1,738,822 | 12/1929 | Odin | 269/78 |
| 2,695,649 | 11/1954 | Tilden | 269/242 |
| 2,734,410 | 2/1956 | Gipperich | 269/252 |
| 3,264,041 | 8/1966 | Lill | 308/6 R |
| 3,926,422 | 12/1975 | Wilson | 269/242 |
| 4,046,364 | 9/1977 | Coope et al. | 269/244 |
| 4,054,280 | 10/1977 | Alberts | 269/224 |
| 4,232,857 | 11/1980 | Bezubik et al. | 269/244 |

OTHER PUBLICATIONS

Cleaving Machines for Soft and Hard Crystals, F. C. Hallberg, et al., Rev. Sci. Instrum., vol. 52(5), pp. 759–762, May 1981.

*Primary Examiner*—Robert C. Watson
*Attorney, Agent, or Firm*—John R. Manning; John O. Tresansky; Sol Sheinbein

[57] ABSTRACT

A workpiece holding vise (10) uses a pair of jaw assemblies (12, 14) simultaneously driven in opposed reciprocation by a single shaft (26) having oppositely threaded sections to automatically center a workpiece (60) beneath a tool. Both jaw assemblies (12, 14) are suspended above the vise bed (20) by a pair of parallel guide shafts (56, 58) attached to the vise bed. Linear rolling bearings (54) fitted around the guide shafts and firmly held by opposite ends of the jaw assemblies (12, 14) provide rolling friction between the guide shafts (56, 58) and the jaw assemblies (12, 14). A bellville washer (46) at one end of the drive shaft (26) and thrust bearings at both drive shaft ends hold the shaft in compression between the vise bed (20), thereby preventing wobble of the jaw assemblies due to wear between the shaft and vise bed.

13 Claims, 3 Drawing Figures

WORKPIECE POSITIONING VISE

ORIGIN OF THE INVENTION

The invention described herein was made by employees of the U.S. Government and may be manufactured and used by or for governmental purposes without the payment of any royalties thereon or therefor.

TECHNICAL FIELD

The invention relates to workpiece positioning devices and, more particularly, to a vise for precision centering of a workpiece.

BACKGROUND ART

Frequently, fabrication processes require that a machining operation be performed at, or very near to, the center of one surface of a fragile or brittle workpiece. An exemplary machining operation is the cleaving of pieces of crystals of hard materials such as lithium fluoride, LIF, into flat blanks. Like diamond cutting, this operation as presently performed is time-consuming, requiring considerable skill and patience on the part of the technician. Cleavage of each hard crystal workpiece must occur along a plane at half the thickness of the crystal so that parting forces will be equally balanced against both sides of the crystal. To obtain one crystal blank of a desired thickness from a larger piece of crystal, the larger crystal piece must be subjected to multiple cleaving operations in which the crystal piece is bisected into successively thinner slabs. When the thickness of a LIF crystal workpiece, for example, is reduced to less than 2 millimeters, balance and control of the applied parting forces are critical to avoid crystal breakage. Present machining operations require that a fragile or brittle workpiece be carefully measured, clamped in a workpiece holder or jig, and the workpiece holder painstakingly centered relative to a tool such as a drill bit or a cleaving blade held by a machine.

Workpiece centering vises are available for general machine shop use for holding workpieces which are larger in size, of a more ductile composition and durable structure than brittle workpieces such as lithium fluoride crystals.

Typically, centering vises have two oppositely movable jaws for holding a workpiece in compression. The separation between the jaws is usually adjusted by rotation of a single central screw having right and left-hand threads at opposite ends. Workpiece centering vises are particularly useful in repetitious fabrication processes where the dimensions of similar workpieces tend to differ significantly because,if accuracy and precision are not important, a single, preliminary orientation of the vise relative to a machine tool,for example, eliminates the necessity of continuously re-orienting the vise to accommodate variations in size between subsequent workpieces.

One type of presently available centering vise has an open frame supporting a single screw with right and left hand threads at opposite ends. A pair of facing jaws with central threaded openings engaging oppositely threaded sections of the screw, rest on the sides of a frame. Separation between the jaws is controlled by turning the single screw. Another state of the art centering vise has the sides of both jaws supported by a lathe bed machined into the bed-frame of the vise. Although presently available workpiece centering vises provide some measure of saving of set-up time in repetitious fabrication processes, they are not entirely suitable for handling small workpieces of fragile or brittle materials like hard crystals, particularly during such delicate processes as crystal cleaving. Delicate workpieces such as those of brittle materials, have a tendency to shatter if subjected to more than very slight compression when held between the jaws of a vise. Vise jaws supported by linear surfaces such as lathe beds or the sides of a bed-frame drag against their supporting surfaces when adjusted, thereby creating frictional forces which impede adjustment of the jaws via the screw and delaying tactile perception of minute adjustments in the jaw separation. This prevents such vises from being repetively operated to a close degree of precision. Additionally, it is quite easy for a technician using presently available vises to unwittingly move the jaws too close together and crush or shatter a fragile or brittle workpiece.

Brittle workpieces such as lithium fluoride crystals must not only be precisely centered during a cleaving process, but one axis of the crystal must be oriented parallel with the blade of a cleaving machine. If the drag between both sides of the jaws and their supporting surfaces is not continuously equal, the jaws tend to wobble when adjusted. Consequently, opposite jaw faces may engage different ends of the workpiece and either hold it skewed relative to a machine tool or subject it to a destructive compressive couple. If the workpiece is a thin, brittle crystal this may either cause the workpiece to be shattered or to be cleaved at an angle to its plane of crystalization, thereby resulting in cleaved crystal blanks with irregular, stepped rather than smooth surfaces.

Furthermore, wear between the adjusting screw and the vise frame introduces axial end-play in the screw which reduces the ability of the vise to provide precise centering of successive workpieces. The only way provided by presently available workpiece centering vises to accommodate for such end-play is frequent reorientation of the vise relative to the machine tool. Reorientation, however, is time consuming and not completely satisfactory because it only partially compensates for end play but does not eliminate it. It is apparent, therefore, that the absence of precision and the delay in tactile perception render state of the art centering vises unsuitable for use with brittle workpieces of materials such as hard crystal, particularly where quick set-up and repetitive precision are desired.

STATEMENT OF INVENTION

Accordingly, it is an object of the present invention to provide an improved, work-piece centering vise.

It is another object to provide a vise able to quickly and precisely center workpieces.

It is still another object to provide a vise able to repetitively and precisely center delicate or brittle workpieces.

It is yet another object to provide a vise able to quickly and precisely center delicate or brittle workpieces of different dimensions.

It is a further object to provide a workpiece centering vise able to compensate for axial end-play in its jaw adjusting screw.

It is also an object to provide a workpiece centering vise furnishing a heightened tactile sensation of minute jaw adjustments.

These and other objects are achieved with having facing traveling jaw assemblies engaging oppositely threaded ends of a central adjustment screw with parallel guides passing through adjustable linear motion bearings connected in conjugate pairs to opposite sides of each jaw assembly to suspend the assemblies above the bed of the vise. A bellville washer, in conjunction with axial thrust bearings, is provided at both ends of the adjustment screw.

BRIEF DESCRIPTION OF THE DRAWINGS

A more complete appreciation of this invention and many of the attendant advantages thereof will be readily apparent as the same becomes better understood by reference to the following detailed description when considered in conjunction with the accompanying drawings in which like reference symbols indicate the same or similar components, wherein.

DETAILED DESCRIPTION OF THE DRAWINGS

Figure 1:
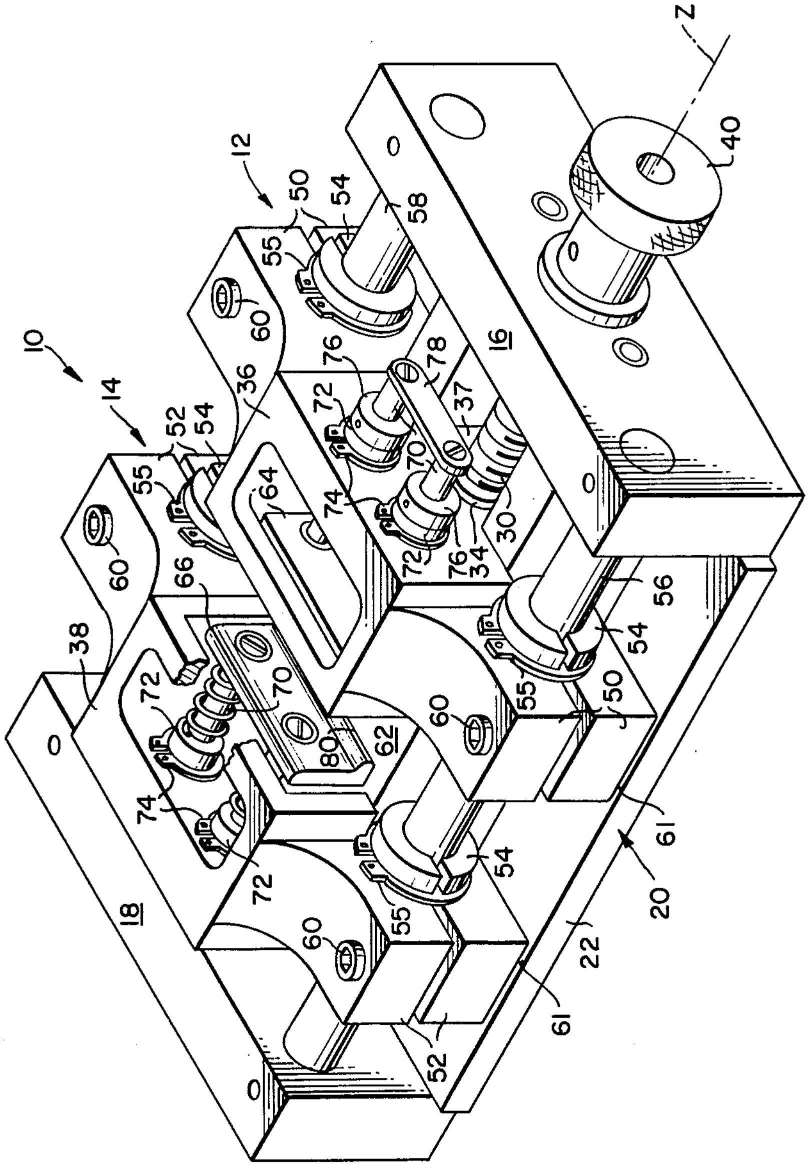
FIG. 1 is an isometric projection of an embodiment of the invention.
Figure 2:
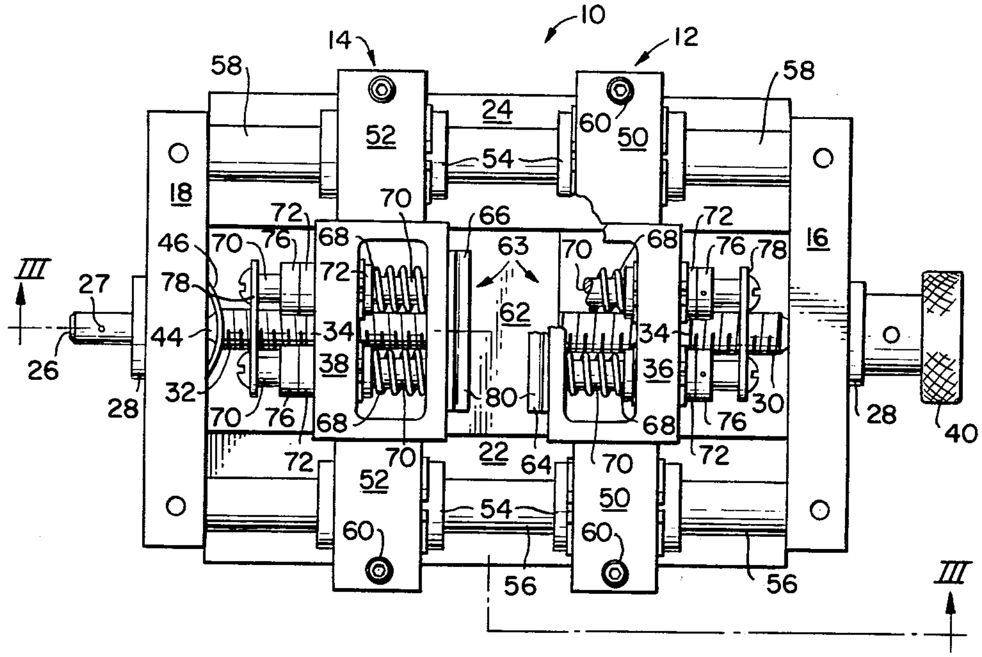
FIG. 2 is a top view of the embodiment shown in FIG. 1.
Figure 3:
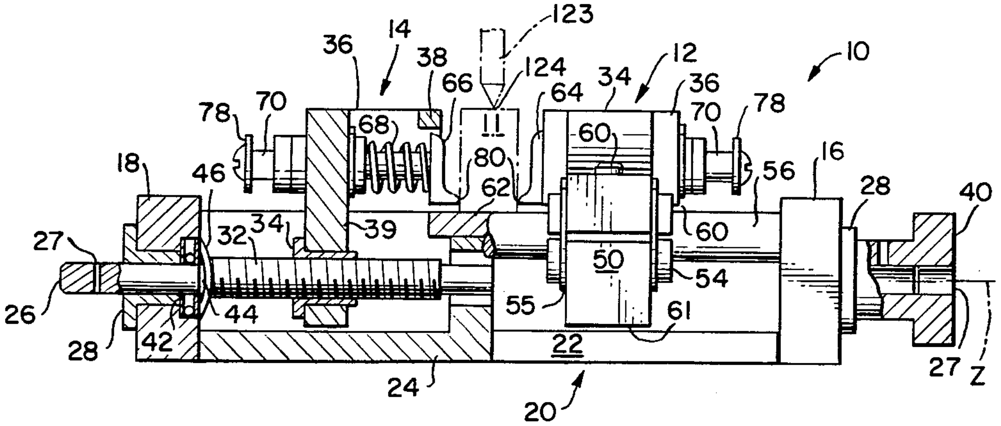
FIG. 3 is a side view taken along line III—III of FIG. 2.

FIG. 1 illustrates the vise 10 of the invention as having two opposed, traveling jaw assemblies 12, 14 positioned between opposite end plates 16, 18 of a vise bed 20. As more clearly shown in FIGS. 2 and 3, L-shaped bed plates 16, 18, 22, 24 interconnect the end plates to form a rigid vise bed. A centrally positioned adjusting screw 26 extends the length of the vise bed 20. The screw has smooth extremities 27 supported by smooth bore bushings 28 which are force fit into coaxial holes formed in end plates 16, 18. Adjusting screw 26 is provided with a right-hand threaded section 30 and a left-hand threaded section 32 intermediate of its smooth extremities. Each of the threaded sections 30, 32 is received by a threaded collar bushing 34 force fit into protruding tongues 37, 39 of clamp blocks 36, 38 central to each of the jaw assemblies 12, 14. A knurled knob 40 may be attached to either extremity of screw 26 and, when turned, rotates the screw drive jaw assemblies 12, 14 in opposite directions along the axis Z of screw 26. Thrust bearings 42 (only one shown) are inserted between end plates 16, 18 and necks 44 formed by the transition in screw 26 between the smooth extremities and the threaded sections 30, 32 of greater diameter to remove most end-play, i.e., axial clearance between necks 44 and end plates 16, 18. To prevent the introduction of end-play into screw 26 through sources such as wear, a bellville washer 46 is placed between one neck 44 and its adjacent end plate 18. In effect, this arrangement holds the screw 26 in compression between end plates 16, 18.

Split blocks 50, 52 are integrally formed on either side of clamp blocks 36, 38. Each of the split blocks accommodates a conventional linear motion bearing 54. Split or "E" ring 55 are fitted into circumferential grooves in bearing 54 to prevent the outer races of the bearings from moving axially relative to the split blocks. Each pair of bearings 54 on one side of vise 10 are coaxially aligned to receive one of a pair of parallel guide shafts 56, 58. The shafts may be formed of smooth steel. Clamp screws 60 connect the distal ends of split blocks 50, 52 and provide a means for adjusting the rolling friction between bearings 54 and shafts 56, 58. Shafts 56, 58 suspend opposite sides of jaw assemblies 12, 14 above vise bed plates 22, 24, thereby creating air gaps 61 separating jaw assemblies 12, 14 from vise bed 20.

Ball bushings, one type of linear motion bearing, have outer cylindrical shells which may be easily held by split blocks 50, 52. The outer shells of ball bushings have hardened inner surfaces on which roll rows of balls in linear paths parallel to the longitudinal axis of the bushing. Deflectors at the end of each shell pick up the balls and return them through channels to the opposite end of the shell, where the balls are forced by the motion of successive balls into the load zone between the inner surface and the guide shaft. Ball bushings are available with an axially split cylindrical shells so that adjustment of the accommodating split blocks subjects the shells to radial compression, thereby creating some axial stiffness between the bushings and the guide shafts.

Linear motion bearings have a low spread between their static or breakaway coefficient and their kinetic or dynamic coefficient under motion. The low spread assures that the surge condition which occurs as the jaw assemblies are put into motion is minimized, thus enhancing the tactile sensitivity of jaw motion provided to a technician by adjusting screw 26. The suspension of jaw assemblies 12, 14 above vise bed 20 assures the absence of drag during movement of the jaw assemblies, thereby enhancing the responsivity of the jaw assemblies to rotation of the adjusting screw. Consequently, the assemblies are responsive to the slightests rotation of screw 26. The rolling friction provided by bearings 54 is of very low magnitude in comparison to such frictional forces as drag between vise jaws and beds in presently available vises, and will not, therefore, impair the responsiveness of jaw assemblies 12, 14.

A horizontal support surface 62 projecting slightly above base plates 22, 24 is provided for placement of a workpiece 11. A clamp assembly 63 having opposing jaw pieces 64, 66 is mounted in clamp blocks 36, 38 and lightly spring-loaded to engage and hold the workpiece with a compressive force dependent upon the size, spring constant and amount of compression of springs 68. The clamp blocks have a recessed side to receive jaw pieces 64, 66 during compression. The springs are positioned on a pair of short shafts 70 which are connected in parallel to the back side of each jaw piece 64, 66. Each of shafts 70 pass through linear rolling bearings 72 retentively fitted into the sides of clamp blocks 36, 38 opposite the jaws pieces. Conventional split or "E" rings 74 are fitted into circumferential grooves in bearings 72 on both sides of the clamp block walls to prevent the bearings from slipping relative to the sides of the clamp blocks. The shafts hold jaw pieces 64, 66 suspended above support surface 62, thus preventing drag due to friction. Collars 76 around the distal ends of shafts 70 limit the travel of jaw pieces 64, 66 so that springs 68 are under constant compression. A bar 78 couples the distal ends of each pair of shafts 70 to assure that opposite ends of jaw pieces 64, 66 are equally extended from the clamp block recesses when not engaging a workpiece. Each jaw piece 64, 66 has a protruding toe 80 to engage opposite sides of the base of a workpiece as the jaw assemblies are closed, thereby avoiding tipping of the workpiece. The location of the toes 80 of opposing jaw pieces 64, 66 provides a means for holding a brittle workpiece steady while allowing both sides of the workpiece to spread-apart and separate during cleaving. When an irregularly positioned workpiece is first engaged by one end of a jaw piece, the cooperation between shafts 70, springs 68 and bars 78 assure that the other end of the jaw piece is simultaneously compressed into the clamp block recess with the engaging end of the jaw piece thereby assuring that the non-engaging end will not touch the workpiece unitl the other jaw piece has forced the side of the workpiece into parallel alignment with both ends of the jaw piece as the jaw assemblies 12, 14 are closed. This action is an automatic function of the jaw assemblies and assures that the grain of a workpiece, such as the axis of a hard crystal, will be moved into alignment parallel to the lateral edges of the jaw pieces despite any misalignment when the workpiece is originally placed on support surface 62. The absence of friction between the vise bed 20 and the jaw assemblies 12, 14 assures that a technician turning knob 40 will tactilely sense the engagement of a workpiece between both toes 80 of the jaw assemblies immediately upon engagement.

The longitudinal axes of adjusting screw 26 and guide shafts 56, 58 are generally parallel to and thus define the operational axis Z of the centering vise 10. It is possible, however, by flexibly connecting jaw assemblies 12, 14 to adjusting screw 26 with mechanisms such as slide toggles, to orient the longitudinal axes of guide shafts 56, 58 obliquely to the operational axis.

It is apparent that the invention is particularly useful for repetitive positioning of fragile or very brittle workpieces during various precision machining operations. A pertinent use is centering blanks of a hard crystal material such as lithium fluoride under a blade during cleaving. More particularly, the invention is especially suitable for use with a crystal cleaving machine of the type disclosed in a copending patent application, Ser. No. 06/182,879, filed on Aug. 29, 1980 now U.S. Pat. No. 4,343,287. When used with a cleaving machine, a crystal workpiece 11 of, for example, lithium fluoride, rests on horizontal support surface 62 and abuts the protruding toes 80 of jaw pieces 64, 66 slightly above the horizontal support surface 62. The lightly spring loaded jaw pieces 64, 66 engage opposite faces of the workpiece 11 near its base, thereby stabilizing the workpiece body. This particular workpiece holding arrangement leaves a workpiece body such as a crystal free to splay apart under the impact force of cleaving blade 123 with little horizontal restraint and minimal shock wave damping. This, in turn, permits the shock wave transmitted to the blade 123 to be injected at the upper corner of a workpiece which then propagates downwardly through the cleavage plane of the workpiece in a diagonal direction. Centering of the workpiece under the edge 124 of blade 123 occurs when both toes 80 engage the workpiece. This assures that the cleaving blade cutting edge 124 will engage the workpiece at its thickness midpoint to avoid shattering or partial breakage of workpieces such as hard crystals due to an imbalance in shock wave forces.

Workpiece centering vise 10 may be easily positioned on the frame of a machine tool such as the crystal cleaving machine described simply by lowering the tool or cleaving blade 123 and sliding the bed 20 of vise 10 along the frame of the machine transversely to the direction of travel of the cleaving blade while closing the jaw assemblies 12, 14 to embrace opposite sides of the blade. The base 20 of the vise 10 may then be firmly attached to the machine frame, as by dogs bolted to the frame, the jaw assemblies opened ("backed-off") and the cleaving blade 123 raised. For precision performance, the bed 20 of the vise should be perpendicular to the direction of travel of the cleaving blade and the lateral protrusions or feet 80 of the jaw assemblies should be parallel to the plane defined by the direction of travel of the edge 124 of blade 123. When a workpiece centering vise is properly aligned with the cleaving blade, a crystal cleaving machine can quickly and repetitively cleave workpieces such as pieces of hard crystals with a reliable degree of precision. The resulting cleaved plates have smooth opposed surfaces and tend to be free of defects such as crystal lattice steps.

We claim:

1. A workpiece positioning device comprising:
- a rigid frame (20) having a rigid bed (22, 24) and end pieces (16, 18);
- a pair of assemblies (12, 14) disposed intermediate of said end pieces;
- means (26) rotatably supported by said end pieces, engaging said pair of assemblies for simultaneously driving each of them in opposed reciprocation;
- at least a pair of parallel cylindrical guides (56, 58) supported by said end pieces on opposite sides of said rotatably supported means and maintaining said pair of assemblies spatially suspended above said cylindrical rigid bed;
- means (54) interposed between said guides and said assemblies for providing rollable bearing surfaces there between; and
- means (46) contacting said rotatably supported means and at least one of said end pieces for effecting a compressive force there between.

2. The device of claim 1 wherein said assemblies includes means (50, 52, 60) for adjusting rolling friction between said interposed means and said guides.

3. The device of claim 2 wherein said rolling friction adjusting means comprises split blocks(50, 52) and an interconnecting threaded member (60).

4. The device of claim 1 wherein said interposed means includes a linear rolling bushing (54).

5. The device of claim 1 wherein said interposed means includes a split ring (55).

6. The device of claim 1 wherein said contacting means includes a bellville washer (46).

7. The device of claim 1 wherein said contacting means includes at least one thrust bearing (42).

8. The device of claim 1, further including jaw pieces (64, 66) supported by said pair of assemblies for holding a workpiece.

9. The device of claim 8 further including means for resiliently urging said jaw pieces to exert a compressive force on a workpiece.

10. The device of claim 1 wherein said rotatably supported means includes a pair of end sections (27) of lesser diameter forming junctions (44) with a pair of oppositely threaded intermediate sections (30, 32) of greater diameter.

11. The device of claim 10 wherein said contacting means includes at least one thrust bearing (42) interposed between one of said end sections (27) and end plates (16, 18).

12. The device of claim 11 wherein said contacting means includes a bellville washer (46) having an aperture of intermediate diameter positioned on one of said end sections in compression between one of said junctions and end plates.

13. A workpiece positioning device comprising:
- a plurality of spaced apart elongate structural members (22, 24);
- a pair of plates (16, 18) interconnecting the ends of said structural members to form a rigid bed (20);

a drive shaft (26) having end sections (27) of lesser diameter rotatably supported by said end plates, said end sections forming junctions (44) with a pair of oppositely threaded intermediate sections (30, 32) of greater diameter lying between said end plates;

a pair of thrust washers (42) fitted between said end sections and said end plates;

a pair of facing jaws (12, 14) each having split arms (50) on opposite ends defining coaxial lumina, and protruding tongues (37, 39) engaging said oppositely threaded intermediate sections;

a plurality of adjustable diameter linear motiong bearings (54) clasped in said lumina by said split arms;

means (60) for adjusting the diameters of said lumina;

at least a pair of parallel cylindrical guide shafts (56, 58) passing through said bearings supported by said end plates with sufficient separation from said structural members to prevent said jaws from touching said structural shapes; and a bellville washer (46) having an aperture of intermediate diameter positioned around one of said end sections in compression between one of said junctions and end plates.

* * * * *